United States Patent
Lai (10) Patent No.: US 8,857,300 B2
(45) Date of Patent: Oct. 14, 2014

(54) JOINT RECOGNITION MEMBER

(75) Inventor: Ying-Tsung Lai, Taichung (TW)

(73) Assignee: Rote Mate Industry Co., Ltd., Taichung (TW)

(*) Notice: Subject to any disclaimer, the term of this patent is extended or adjusted under 35 U.S.C. 154(b) by 395 days.

(21) Appl. No.: 12/801,788

(22) Filed: Jun. 25, 2010

(65) Prior Publication Data

US 2011/0318090 A1 Dec. 29, 2011

(51) Int. Cl.
*B25B 23/00* (2006.01)
*G09F 3/00* (2006.01)
*B25B 13/56* (2006.01)
*B25B 15/00* (2006.01)
*B25B 23/12* (2006.01)

(52) U.S. Cl.
CPC .............. *B25B 15/001* (2013.01); *G09F 3/00* (2013.01); *B25B 13/56* (2013.01); *B25B 23/12* (2013.01); *Y10S 81/05* (2013.01)
USPC ........... 81/438; 81/121.1; 81/185; 81/DIG. 5; 403/322.2; 403/361; 403/383

(58) Field of Classification Search
CPC ..... B25B 23/0035; B25B 23/12; F16B 21/06; F16B 21/073; F16B 21/078; F16B 21/16
USPC ................ 403/322.2, 361, 383, 332; 81/438, 81/121.1, 185, DIG. 5
See application file for complete search history.

(56) References Cited

U.S. PATENT DOCUMENTS

| | | | | |
|---|---|---|---|---|
| 2,950,937 | A * | 8/1960 | Bedford, Jr. | 403/372 |
| 7,261,023 | B2 * | 8/2007 | Taguchi | 81/451 |
| 7,470,081 | B2 * | 12/2008 | Miyahara et al. | 403/221 |
| 7,559,714 | B2 * | 7/2009 | Ruhlander | 403/263 |
| 7,836,801 | B2 * | 11/2010 | Huang | 81/177.1 |
| D645,329 | S * | 9/2011 | Hsu | D8/86 |
| 8,172,236 | B2 * | 5/2012 | Shibata | 279/143 |
| 2006/0280572 | A1 * | 12/2006 | Lin | 409/234 |
| 2008/0087142 | A1 * | 4/2008 | Lin | 81/177.1 |
| 2008/0190251 | A1 * | 8/2008 | Huang | 81/438 |
| 2008/0216618 | A1 * | 9/2008 | Chen | 81/451 |
| 2009/0049959 | A1 * | 2/2009 | Gibbs | 81/180.1 |
| 2010/0275741 | A1 * | 11/2010 | Lai | 81/438 |

* cited by examiner

*Primary Examiner* — Daniel P Stodola
*Assistant Examiner* — Jonathan Masinick
(74) *Attorney, Agent, or Firm* — Raymond Y. Chan; David and Raymond Patent Firm (57) ABSTRACT

A joint recognition member is revealed. The joint recognition member includes a joint body formed by a cylinder connected with a polygonal prism. A polygonal hole with a magnet part is set on the cylinder so as to attract driver bits by magnetic force. The device features on that: a narrow neck part with a ring groove is arranged at one end of the cylinder near the polygonal prism. The ring is wrapped around the narrow neck part and outside diameter of the ring is no smaller than that of the cylinder. A protruding ring on the ring is mounted and moved freely in the ring groove. An outer surface of the ring is labeled with words such as size. According to the corresponding polygonal hole, the ring has different shapes and sizes in various colors for fast recognition.

20 Claims, 12 Drawing Sheets

JOINT RECOGNITION MEMBER

BACKGROUND OF THE INVENTION

1. Fields of the invention

The present invention relates to joints assembled with driver bits, especially to joints with rings outside whose size range are recognized by different colors or words on the surface of the ring.

2. Descriptions of Related Art

Generally, a joint is formed by a polygonal prism connected with a cylinder. The polygonal prism is for mounting and connected with driver rods or power tools for rotating. A polygonal hole is arranged axially at a front end of the cylinder and a magnetic body is disposed on an inner end of the polygonal hole so as to replace different types of drivers bits.

Refer to U.S. Pat. No. 7,082,864 "Tool with protective sheath", and U.S. Pat. No. 5,009,133 "Surface protective fastener tool", the tools revealed are sleeves connected with drivers or the like such as joints. While applying a sheath to a tool, the sheath covers the whole tool and having at least one end thereof projecting slightly beyond an end of the tool. The sheath is fixed to the tool by an inwardly projecting rib in at least one end of the sheath engaged in an annular groove or channel in an surface of the tool so as to prevent the tool from sliding off the sheath and enable the sheath to rotate freely on the tool.

In another embodiment, when an extension of the sheath is coupled with a socket or other tools, the sheath completely covers the joint or connection between these tool parts. The opposite end of the sheath projects beyond the other end of the extension and an inwardly directed rib engages against the end of the extension to hold the sheath.

As revealed in U.S. Pat. No. 5,009,133, the protective fastener tool includes a lip that extends radially inward overlying one end of dual-end socket wrench so that both ends of the socket wrench are prevented from contacting and abrading an underlying surface.

A protective sheath for tools in prior arts mentioned above is to prevent marring of finished surfaces of the tool. A projection end of the sheath functions to contact the finished surface and prevent the tool (or the cylinder) from contacting the surface as it is rotated. The disadvantage of such design is in that: the sheath needs to cover the whole tool or cylinder so that the material used requires more and the cost is increased. Moreover, other machines are required to complete assembling of the sheath with the tool (or the cylinder). This is time-consuming and the cost is getting higher.

In order to help users get joints with correct size range while assembling different types of driver bits with various size ranges, a joint recognition member with improved structure is required.

SUMMARY OF THE INVENTION

Therefore it is a primary object of the present invention to provide a joint recognition member with features of easy assembling, reduced manufacturing cost and fast recognition.

In order to achieve above object, a joint recognition member of the present invention includes a joint body and a ring.

One end of the joint body is a cylinder and the other end is a polygonal prism. A polygonal hole is set on an opening end of the cylinder and a magnetic part is mounted on an inner end of the polygonal hole. Thus the drive bit is attracted by a magnetic force of the magnetic part for connection and location after the driver bit being mounted into the polygonal hole. The joint recognition member features on that a narrow neck part with a ring groove is disposed on the cylinder, near the polygonal prism. The ring is wrapped around the narrow neck part and is having a protruding ring set on an inner surface thereof for being mounted and moved freely in the ring groove. A curved surface that is tapered from bottom to top is arranged at an inner wall of the protruding ring so as to make the protruding ring mounted into the ring groove quickly and smoothly. Thus the assembling is easy and convenient. Moreover, a barb part is formed on the top of the curved surface and is able to rest against a top surface of the ring groove. Thus the ring is unable to be moved in the opposite direction and released from the narrow neck part after being assembled and located. The connection between the joint body and the ring is secure and tight.

Furthermore, a recessed stopping ring is disposed on one end of the ring, near the barb part. The recessed stopping ring is against an outer edge on top of the narrow neck part while the bottom surface of the ring is against the top surface of the cylinder. Thereby the ring wrapped around the narrow neck part is held and located at a plurality of positions In addition, the ring is made from hard material. In this embodiment, the ring is made from rigid plastic. In order to increase the stretchability of the protruding ring of the ring, the protruding ring is arranged with a plurality of slots spaced at intervals.

An outer surface of the ring is labeled with a marker that can be a size code corresponding to the size and specification of the polygonal hole assembled with, a product name, a shape name or a brand name. Moreover, the ring is designed to have different colors and each color represents a specific model number or size for fast recognition.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENT

Figure 1:
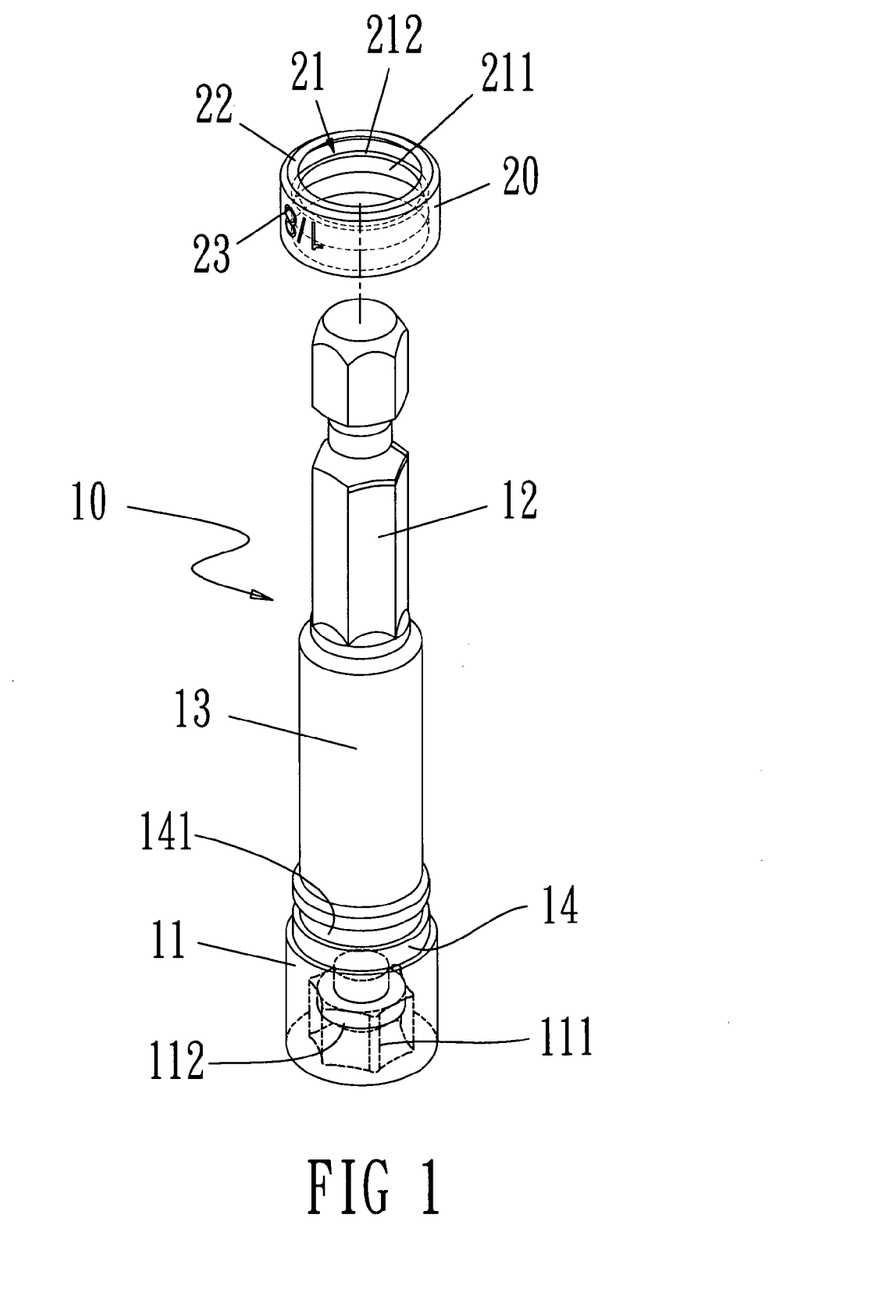
FIG. 1 is an explosive view of an embodiment according to the present invention.
Figure 2:
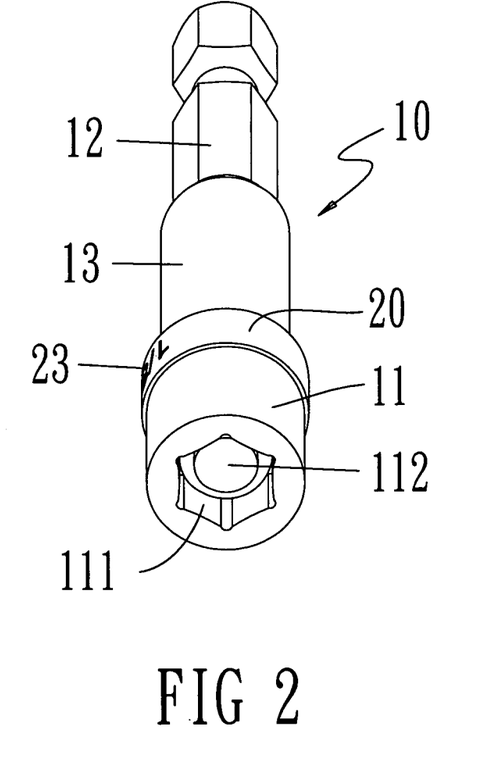
FIG. 2 is a bottom view of an assembled embodiment according to the present invention.
Figure 3:
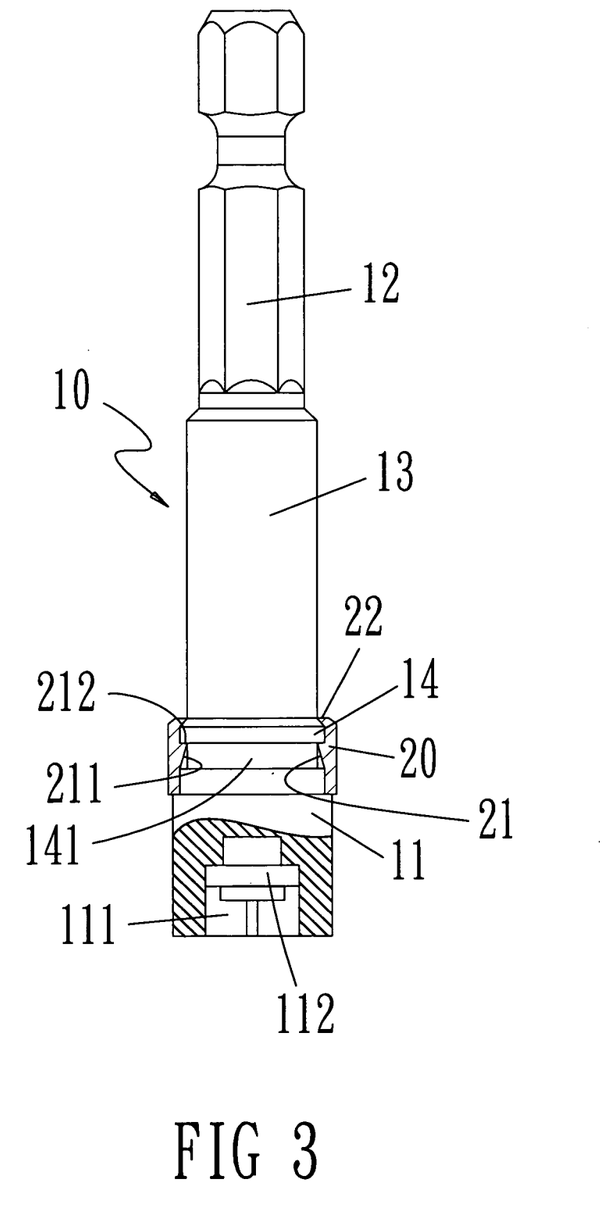
FIG. 3 is a partial front cross sectional view of the embodiment according to the present invention.

Refer from FIG. 1 to FIG. 3, an embodiment of a joint recognition member according to the present invention includes a joint body 10 and a ring 20.

The joint body 10 includes a cylinder 11 on one end and a polygonal prism 12 on the other end thereof. A middle cylinder 13 is connected between the cylinder 11 and the polygonal prism 12. A polygonal hole 111 is set on an opening end of the cylinder 11 and a magnetic part 112 is mounted on an inner end of the polygonal hole 111. Thus a driver bit (not shown in figure) is attracted by a magnetic force of the magnetic part 112 to be connected and located. The outside diameter of the cylinder 11 is larger than the diameter of the polygonal prism 12. Moreover, a narrow neck part 14 with a ring groove 141 is arranged at one end of the cylinder 11 that is near the polygonal prism 12.

The ring 20 is wrapped around the narrow neck part 14 and is having a protruding ring 21 on an inner surface thereof for being mounted, limited and rotating freely in the ring groove 141. A curved surface 211 that is tapered from bottom to top is arranged at an inner wall of the protruding ring 21 so that the protruding ring 21 of the ring 20 is mounted into the ring groove 141 quickly and smoothly. Thus the assembling is easy and convenient. Moreover, a barb part 212 is formed on the top of the curved surface 211 and is able to lean against a top surface of the ring groove 141. Thus the ring 20 is unable to be moved in the opposite direction and released from the narrow neck part 14 after being assembled and located. Therefore, the connection between the joint body 10 and the ring 20 is firm and tight.

Furthermore, a recessed stopping ring 22 is disposed on one end of the ring 20, near the barb part 212. The recessed stopping ring 22 leans against an outer edge on top of the narrow neck part 14. The bottom surface of the ring 20 is resting against the top surface of the cylinder 11. Thereby the ring 20 wrapped around the narrow neck part 14 is held and located at a plurality of positions.

Figure 4:
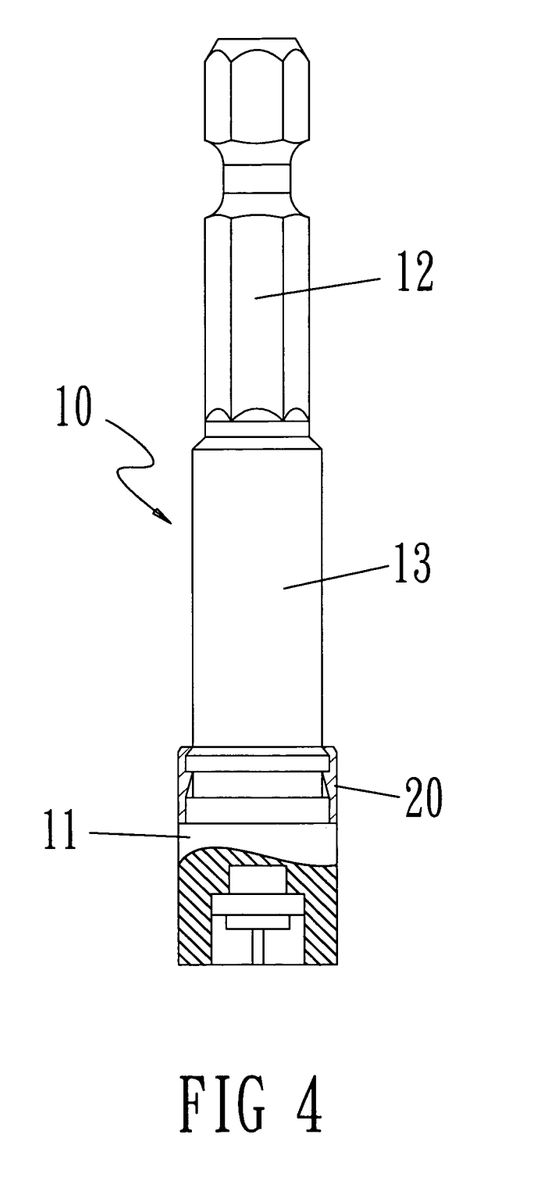
FIG. 4 is a partial front cross sectional view of another assembled embodiment according to the present invention.

As shown in FIG. 3, the outside diameter the ring 20 enclosed the narrow neck part 14 of the present invention is larger than the outside diameter of the cylinder 11. In another embodiment shown in FIG. 4, the outside diameter of the ring 20 is designed to be the same with the outside diameter of the cylinder 11. The ring 20 of the two embodiments provides the same function to be hold by users' hands, as a support point. Thereby while the joint body 10 is indirectly rotated by power tools or hand tools, the rotation of the joint body 10 is more stable and smooth.

Figure 5:
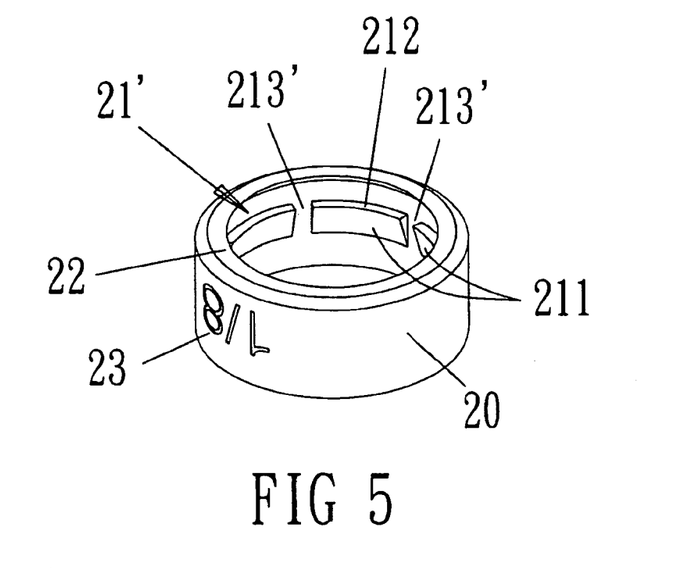
FIG. 5 is a perspective view of a ring of a further embodiment according to the present invention.
Figure 6:
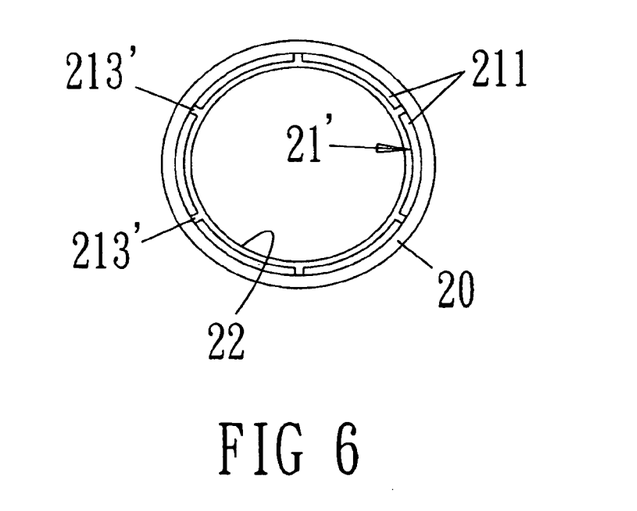
FIG. 6 is a bottom view of a ring of a further embodiment according to the present invention.

As shown in FIG. 5 and FIG. 6, the ring 20 of the present invention is made from hard material. In this embodiment, the ring 20 is made from rigid plastic with a bit stretchability. In order to increase the stretchability of the protruding ring 21' of the ring, the protruding ring 21' is disposed with a plurality of slots 213' spaced at intervals.

Moreover, an outer surface of the ring 20 is marked with a marker 23 that can be a size code corresponding to the size and specification of the polygonal hole 111 assembled with, a product name, a shape name or a brand name. Moreover, the ring 20 is designed to have different colors and each color represents a specific model number or size for fast recognition.

Figure 7:
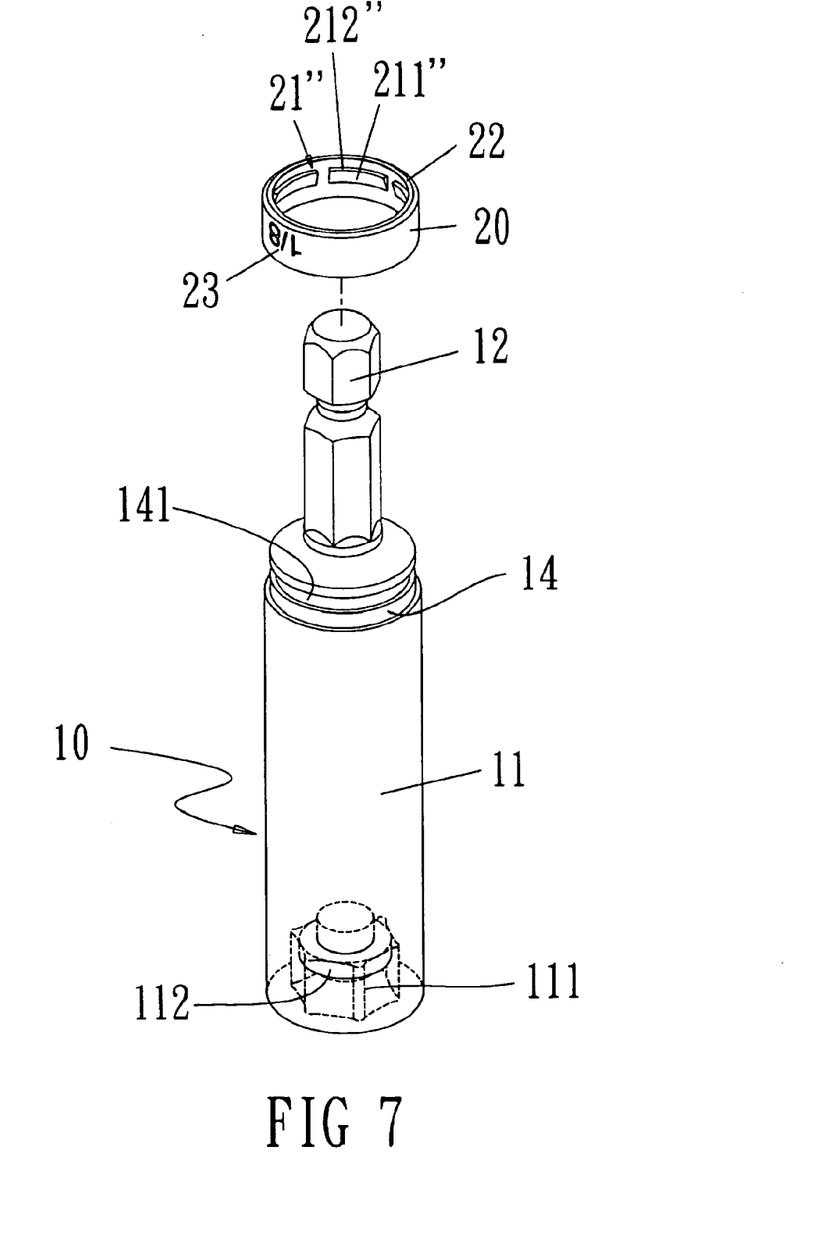
FIG. 7 is an explosive view of a further embodiment according to the present invention.
Figure 8:
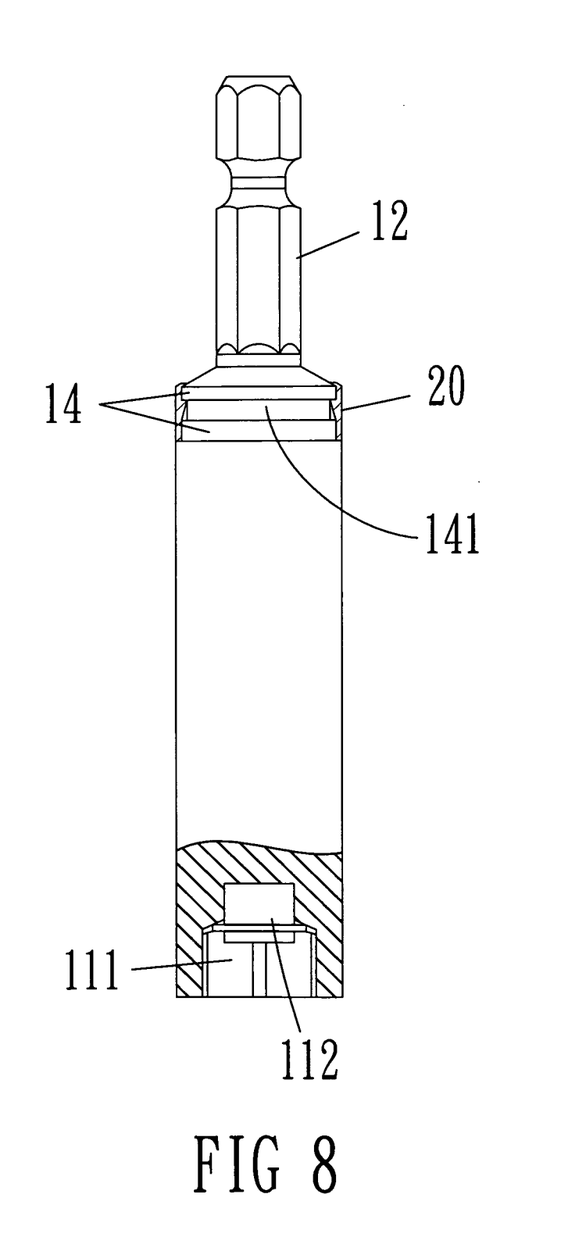
FIG. 8 is a partial front cross sectional view of the embodiment in FIG. 8 according to the present invention.
Figure 9:
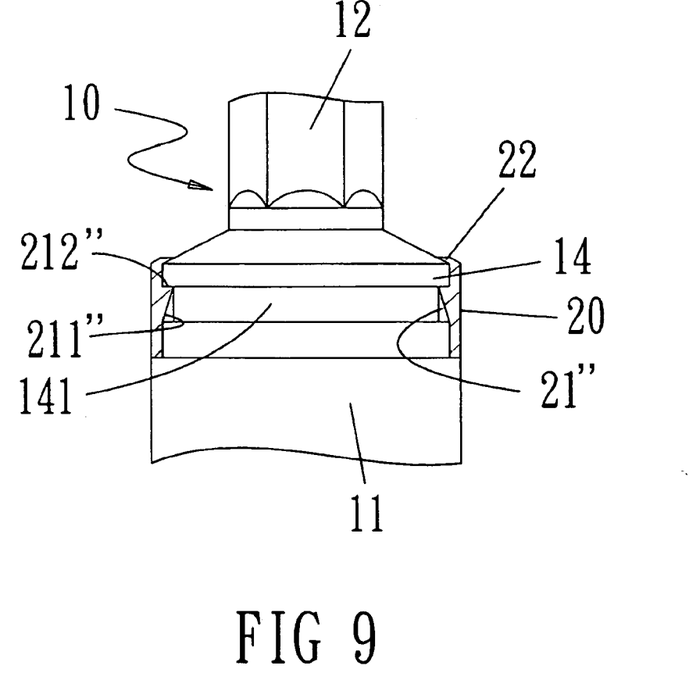
FIG. 9 is a partial enlarged view of the embodiment in FIG. 8 according to the present invention.
Figure 10:
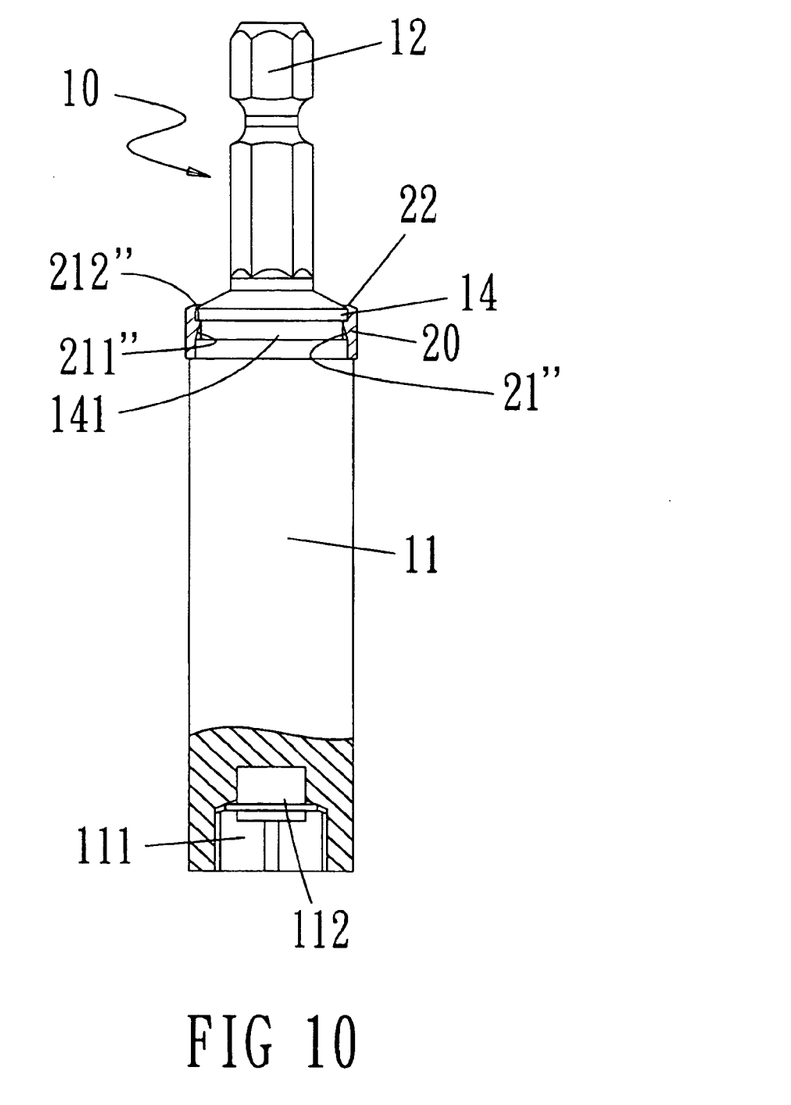
FIG. 10 is a partial front cross sectional view of a further assembled embodiment according to the present invention.

Refer from FIG. 7 to FIG. 9, a further embodiment applied to different type of joint body is revealed. The two embodiments have the same features in the structure while the difference between this embodiment and the above one is in that the joint bodies 10 in different embodiments have different appearances. In this embodiment, one end of a joint body 10 is a cylinder 11 that is connected with a polygonal prism 12 directly. A narrow neck part 14 with a ring groove 141 is disposed with one end of the cylinder 11 that is near the polygonal prism 12. A protruding ring 21" is arranged in the ring 20 and is for being mounted, limited and rotating freely in the ring groove 141. The protruding ring 21" includes a curved surface 211", a barb part 212". and a plurality of slots 213 spaced at intervals. As to the embodiment shown in FIG. 10, it has similar structure to the embodiment in FIG. 7 and the difference between the two embodiments is the outside diameter.

Figure 11:
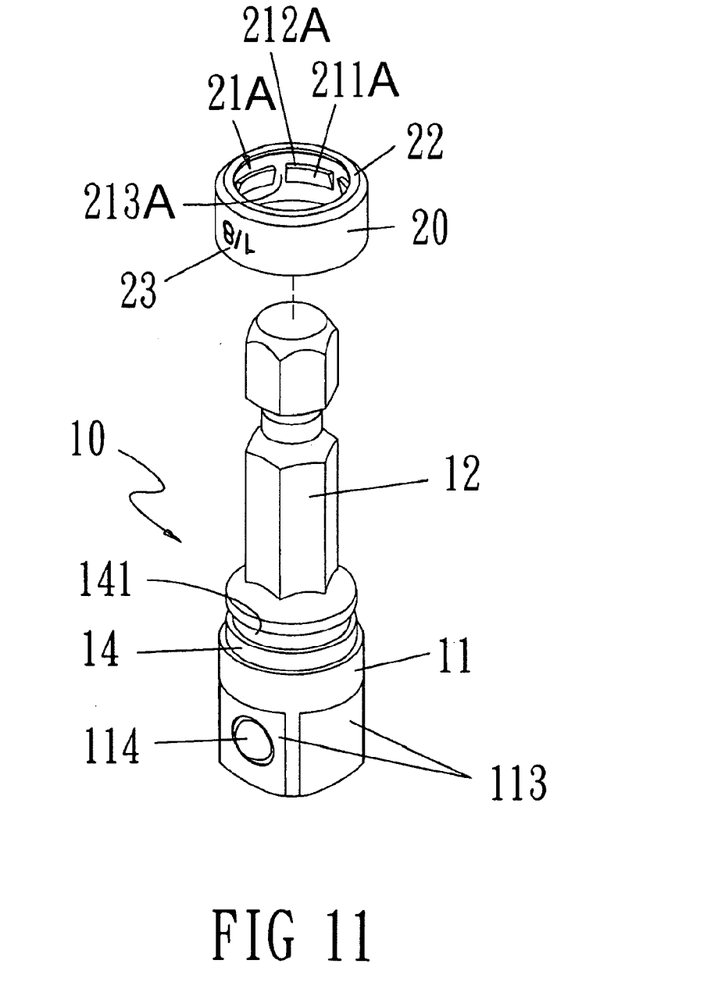
FIG. 11 is an explosive view of a further assembled embodiment according to the present invention.
Figure 12:
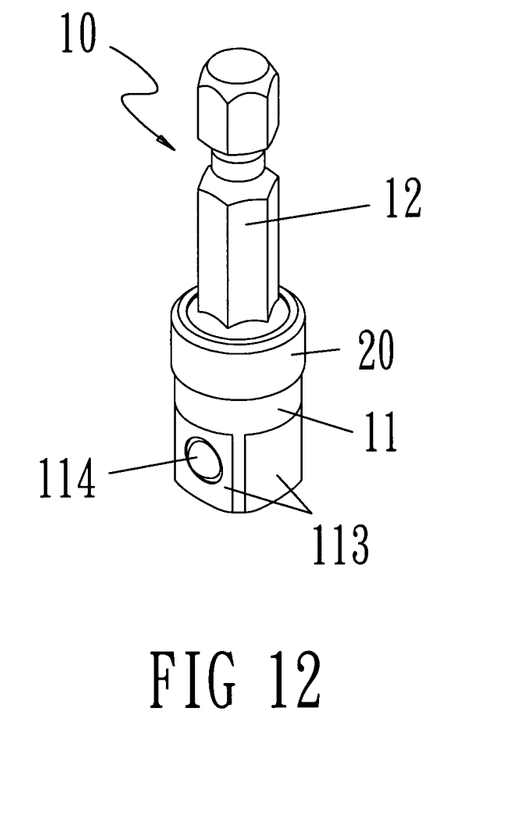
FIG. 12 is an assembled view of the embodiment in FIG. 11 according to the present invention.
Figure 13:
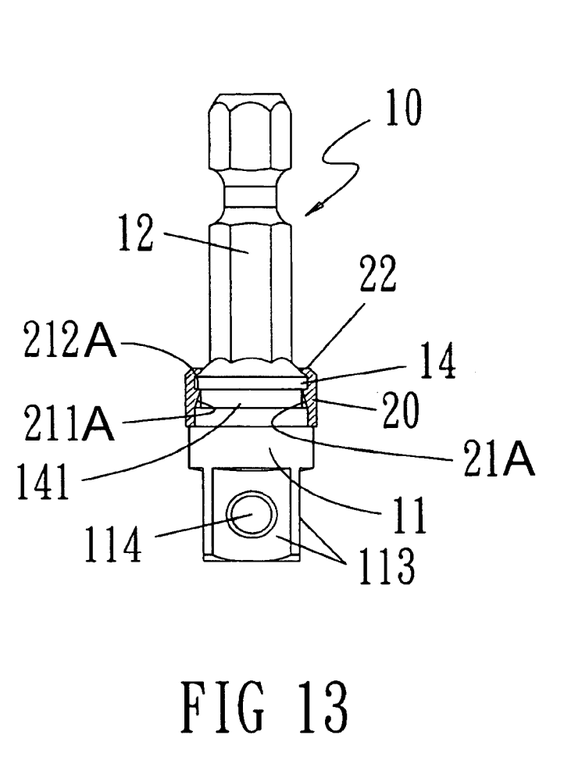
FIG. 13 is a partial front cross sectional view of the embodiment in FIG. 11 according to the present invention.

Refer from FIG. 11 to FIG. 13, a further embodiment with the same effect is disclosed. A joint recognition member consists of a joint body 10 whose one end is a cylinder 11 and one end of the cylinder 11 is connected with a polygonal prism 12. A narrow neck part 14 having a ring groove 141 is arranged at one end of the cylinder 11 with the polygonal prism 12. The other end of the cylinder 11 is disposed with a rectangular prism 113 and one surface of the rectangular prism 113 is arranged with a bead 114 that is exposed only a part thereof.

A ring 20 is wrapped around the narrow neck part 14. A protruding ring 21A is disposed in the ring 20 and is for being mounted, limited and rotating freely in the ring groove 141. The protruding ring 21A includes a curved surface 211A, a barb part 212A. and a plurality of slots 213A spaced at intervals. A marker 23 is labeled on the ring 20 and the ring 20 is designed to have different colors.

In accordance with above structure, the ring 20 rotates freely around the narrow neck part 14.

While being assembled, the ring 20 is put around one end of the joint body 10 with the polygonal prism 12. Then the protruding ring 21A is sliding and mounted into the ring groove 141 of the cylinder 11 easily and smoothly due to the stretchability of the ring 20 and the curved surface 211A of the protruding ring 21A. The above assembling is completed easily and quickly by users and there is no need to use auxiliary equipments.

The joint recognition member of the present invention is preferred to be used in combination with power tools. In use, the ring 20 is held by users' one hand while the other hand of the users operates a power tool to drive the joint body 10 rotating so as to thread fasteners (such as screws) into the places required.

The labeling of the recognition marker 23 on the outer surface of the ring 20 can be completed together with injection molding processes of the ring 20.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A joint recognition member, comprising:
a joint body, which has a one piece structure, having a cylinder formed at one end and a polygonal prism integrally formed at an opposed end, wherein said cylinder has a polygonal hole formed at an opening end thereof and a narrow neck part integrally formed at a position between said opening end of said cylinder and said polygonal prism, wherein a ring groove is formed at said narrow neck part of said joint body; and
a ring rotatably wrapped around said narrow neck part of said joint body, wherein said ring is stationary when said joint body is rotated, wherein said ring has a protruding ring formed at an inner surface and engaged with said ring groove to enable said ring to be freely rotated at said narrow neck part which is formed at said cylinder of said joint body and prevent any longitudinal movement along said narrow neck part of said joint body, wherein a tapered inner surface of said ring abuts against a tapered axially facing outer edge on top of said narrow neck part, wherein an axially facing bottom surfaced of said ring is abutted at an axially facing top surface of said cylinder, wherein said protruding ring has a curved surface formed at an inner wall thereof that is tapered from bottom to top and a barb part formed on top of said curved surface of said protruding ring such that when said protruding ring is engaged with said ring groove, said curved surface of said protruding ring enables said protruding ring to mount in said ring groove while said barb part of said protruding ring is leaned against a top surface of said ring groove so as to prevent said protruding ring to be removed from said narrow neck part of said joint body in a direction towards said polygonal prism, wherein said ring is prohibited to move to said cylinder from said polygonal prism due to the abutment of said bottom surface with said top surface of said cylinder.

2. The joint recognition member, as recited in claim 1, wherein said ring further has a marker provided at an outer surface thereof, wherein said marker is a size code corresponding to a size and specification of said polygonal hole, wherein said joint body further comprises a magnetic part mounted at an inner end of said polygonal hole.

3. The joint recognition member, as recited in claim 2, wherein said protruding ring further has a plurality of slots spaced at intervals and formed along said inner surface of said ring for increasing the stretchability of said protruding ring of said ring.

4. The joint recognition member, as recited in claim 3, wherein a recessed stopping ring is disposed on one end of said ring adjacent to said polygonal prism and said barb part, wherein said recessed stopping, ring leans against an outer edge on top of said narrow neck part.

5. The joint recognition member, as recited in claim 4, wherein an outer diameter of said ring is the same with an outer diameter of said cylinder.

6. The joint recognition member, as recited in claim 2, wherein a recessed stopping ring is disposed on one end of said ring adjacent to said polygonal prism and said barb part, wherein said recessed stopping ring leans against an outer edge on top of said narrow neck part.

7. The joint recognition member, as recited in claim 2, wherein an outer diameter of said ring is the same with an outer diameter of said cylinder.

8. The joint recognition member, as recited in claim 1, wherein said protruding ring further has a plurality of slots spaced at intervals and formed along said inner surface of said ring for increasing the stretchability of said protruding ring of said ring.

9. The joint recognition member, as recited in claim 1, wherein a recessed stopping ring is disposed on one end of said ring adjacent to said polygonal prism and said barb part, wherein said recessed stopping ring leans against an outer edge on top of said narrow neck part.

10. The joint recognition member, as recited in claim 1, wherein an outer diameter of said ring is the same with an outer diameter of said cylinder.

11. A joint recognition member, comprising:
a joint body, which has a one piece structure, having a cylinder formed at one end and a polygonal prism integrally formed at an opposed end, wherein said cylinder has a rectangular prism with a bead formed at a free end thereof and a narrow neck part integrally formed at a position between said cylinder and said rectangular prism, wherein a ring groove is formed at said narrow neck part of said joint body a ring rotatably wrapped around said narrow neck part of said joint body, wherein said ring is stationary when said joint body is rotated, wherein said ring has a protruding ring formed on an inner surface and engaged with said ring groove to enable said ring to be freely rotated at said narrow neck part which is formed at said cylinder of said joint body and prevent any longitudinal movement along said narrow neck part of said joint body, wherein a tapered inner surface of said ring abuts against a tapered axially facing outer edge on top of said narrow neck part, wherein an axially facing bottom surfaced of said ring is abutted at an axially facing top surface of said cylinder, wherein said protruding ring has a curved surface formed at an inner wall thereof that is tapered from bottom to top and a barb part formed on top of said curved surface such that when said protruding ring is engaged with said ring groove, said curved surface of said protruding ring enables said protruding ring to mount in said ring groove while said barb part of said protruding ring is leaned against a top surface of said ring groove so as to prevent said protruding ring to be removed form said narrow neck part of said joint body in a direction towards said rectangular prism, wherein when said ring is mounted at said ring groove, said ring is prohibited to move in an opposite direction from said cylinder to said rectangular prism.

12. The joint recognition member, as recited in claim 11, wherein said ring further has a marker provided at an outer surface thereof, wherein said marker is a size code corresponding to a size and specification of said polygonal hole.

13. The joint recognition member, as recited in claim 12, wherein said protruding ring further has a plurality of slots spaced at intervals and formed along said inner surface of said ring for increasing the stretchability of said protruding ring of said ring.

14. The joint recognition member, as recited in claim 13, wherein a recessed stopping ring is disposed on one end of said ring adjacent to said polygonal prism and said barb part, wherein said recessed stopping ring leans against an outer edge on top of said narrow neck part.

15. The joint recognition member, as recited in claim 14, wherein an outer diameter of said ring is the same with an outer diameter of said cylinder.

16. The joint recognition member, as recited in claim 12, wherein a recessed stopping ring is disposed on one end of said ring adjacent to said polygonal prism and said barb part, wherein said recessed stopping ring leans against an outer edge on top of said narrow neck part.

17. The joint recognition member, as recited in claim 12, wherein an outer diameter of said ring is the same with an outer diameter of said cylinder.

18. The joint recognition member, as recited in claim 11, wherein said protruding ring further has a plurality of slots spaced at intervals and formed along said inner surface of said ring for increasing the stretchability of said protruding ring of said ring.

19. The joint recognition member, as recited in claim 11, wherein a recessed stopping ring is disposed on one end of said ring adjacent to said polygonal prism and said barb part, wherein said recessed stopping ring leans against an outer edge on top of said narrow neck part.

20. The joint recognition member, as recited in claim 11, wherein an outer diameter of said ring is the same with an outer diameter of said cylinder.

* * * * *